(12) United States Patent
Stranges et al.

(10) Patent No.: US 7,815,125 B2
(45) Date of Patent: Oct. 19, 2010

(54) MICROPROCESSOR CARD

(75) Inventors: Lorenzo Stranges, Neuilly sur Seine (FR); Olivier Chamley, Leognan (FR)

(73) Assignee: Oberthur Technologies, Paris (FR)

( * ) Notice: Subject to any disclaimer, the term of this patent is extended or adjusted under 35 U.S.C. 154(b) by 0 days.

(21) Appl. No.: 12/057,402

(22) Filed: Mar. 28, 2008

(65) Prior Publication Data

US 2008/0237357 A1    Oct. 2, 2008

(30) Foreign Application Priority Data

Mar. 30, 2007    (FR) .................................. 07 54193

(51) Int. Cl.
    *G06K 19/06*    (2006.01)
(52) U.S. Cl. ..................................... 235/492
(58) Field of Classification Search .................. 235/492
    See application file for complete search history.

(56) References Cited

U.S. PATENT DOCUMENTS 5,838,059 A * 11/1998 Inoue et al. ................. 257/679
5,847,372 A    12/1998 Kreft

| | | |
|---|---|---|
| 6,685,096 B1 | 2/2004 | Degrauwe et al. |
| 2004/0124246 A1* | 7/2004 | Allen et al. .................. 235/492 |
| 2004/0162932 A1* | 8/2004 | Mizushima et al. .......... 711/103 |
| 2005/0252978 A1* | 11/2005 | Nishizawa et al. .......... 235/492 |
| 2007/0145135 A1* | 6/2007 | Jogand-Coulomb et al. . 235/451 |

FOREIGN PATENT DOCUMENTS

| | | |
|---|---|---|
| DE | 44 06 704 C1 | 7/1995 |
| EP | 0 779 598 A2 | 6/1997 |
| FR | 2 680 262 A | 2/1993 |
| FR | 2 880 713 A1 | 7/2006 |
| WO | 2004/029860 A1 | 4/2004 |

* cited by examiner

*Primary Examiner*—Seung H Lee
*Assistant Examiner*—Christopher Stanford
(74) *Attorney, Agent, or Firm*—Young & Thompson

(57) ABSTRACT

The microprocessor card includes a first microprocessor and a second microprocessor, the first microprocessor including elements for commanding the second microprocessor. In embodiments, the card includes electrical contacts adapted to carry command signals, these electrical contacts being connected exclusively to the first microprocessor. In embodiments, the first microprocessor includes elements for commanding the second microprocessor via commands conforming to the ISO 7816 standard. The first microprocessor uses a lower level of security than the second microprocessor.

51 Claims, 4 Drawing Sheets

MICROPROCESSOR CARD

Figure 1:
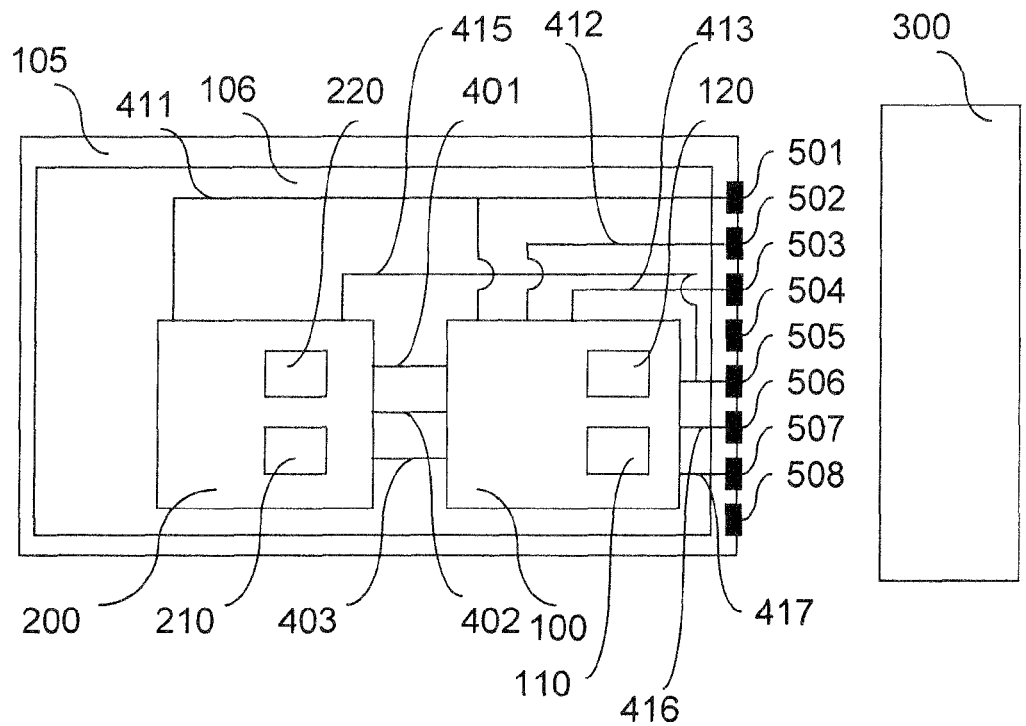

The present invention concerns a microprocessor card. It applies more particularly to microprocessor cards conforming to the ISO 7816 standard and to microprocessor cards conforming to the MMC (MultiMedia Card) standard.

Some microprocessor cards can contain multiple applications stored in non-volatile memory, for example in ROM or EEPROM, i.e. their microprocessor holds in memory executable (or interpretable) codes of multiple data processing applications and is adapted to execute them. In some cases, microprocessor cards can include an application with a high security requirement and an application with a moderate security requirement at one and the same time.

Applications with a high security requirement are typically payment applications, for example, or applications that identify the holder (passport, identity card). For these applications, clients demand a high level of security, and this necessitates particularly time-consuming and costly evaluations, for example according to common criteria, effected by an independent certified organization. Some evaluations can take more than a year and cost tens of thousands of euros for a microprocessor card design. Further evaluation, possibly on a smaller scale, is required if the application evolves.

Applications with a moderate security requirement include, for example, mobile telephone applications (for example mobile telephone network subscriber identification) and transport applications (for example access to a public transport network). These applications generally do not necessitate certification or necessitate certification that is much less time-consuming and costly than those referred to above.

If these two types of application coexist on the same smart card microprocessor, the applications with moderate security requirements must be evaluated and certified according to the same criteria as the applications with a high security requirement, which leads to high costs and long delays.

Moreover, microprocessor card readers are generally adapted to read a microprocessor card via contacts provided for this purpose on the surface of the microprocessor card, the function of which is generally predetermined and does not change during the life of the reader. To adapt to a new function of a contact, it is generally necessary to modify the electronics of the reader, which is generally not possible (at reasonable cost) by the general public using these readers.

Also, the number of contacts according to the ISO 7816 standard is limited to eight, five of which are used for the protocol conforming to the ISO 7816 standard (c1, c2, c3, c5, c7), two can be used for a high-speed USB protocol (for example c4 and c8), or three in the case of an MMC protocol, which limits the capacity for evolution of microprocessor cards.

The present invention aims to remove these drawbacks.

To this end, a first aspect of the present invention is directed to a microprocessor card including a first microprocessor, characterized in that it further comprises a second microprocessor, said first microprocessor including means for transmitting to the second microprocessor commands coming from outside the card and for transmitting to the outside of the card responses to those commands coming from the second microprocessor.

Thanks to these provisions, a microprocessor card reader can send commands to the two microprocessors without it being necessary to use additional contacts compared to the situation in which only one microprocessor is commanded. Moreover, the security of the first and second microprocessors can be certified independently.

According to particular features, the first microprocessor is adapted to run a first application software that determines the microprocessor commands to be transmitted to the second microprocessor.

According to particular features, the card according to the present invention comprises external electrical contacts intended to convey control signals, said external electrical contacts being connected only to the first microprocessor.

According to particular features, the first microprocessor comprises means for controlling the second microprocessor by means of commands conforming to the ISO 7816 standard.

Thanks to these provisions, a reader can send APDU (Application Protocol Data Unit) commands to both microprocessors.

According to particular features, the card according to the present invention comprises at least one input/output line according to the ISO 7816 standard that connects the two microprocessors and is used to exchange information between the two microprocessors.

According to particular features, a clock connection connects the two microprocessors, the first microprocessor supplying to the second microprocessor in a manner conforming to the ISO 7816 standard, a clock signal based on a clock signal internal to the first microprocessor.

Thanks to these provisions, the two microprocessors can operate with different clocks, for example timed at different frequencies.

According to particular features, the first microprocessor comprises means for inhibiting said clock signal supplied to the second microprocessor.

Thanks to these provisions, if the second microprocessor comprises means for selecting a standby mode in the absence of clock signals, in order in particular to economize on the current supplied by the reader, which can be particularly critical when the reader is in a battery-powered portable object, such as a mobile telephone, the first microprocessor can command all or part of the second microprocessor to be placed in standby mode.

According to particular features, the first microprocessor is adapted to supply a reset signal to the second microprocessor in a manner that conforms to the ISO 7816 standard.

The reset signal connection corresponds to contact c2 of the ISO 7816 standard.

According to particular features, the two microprocessors are connected in parallel to two flush power supply contacts.

According to the ISO 7816 standard, the "Vcc" contact c1 and the "GND" contact c5 supply power to a microprocessor card.

Thanks to these provisions it is a simple matter to supply both microprocessors with power.

According to particular features, the two microprocessors are parts of two different microcircuits.

Thanks to these provisions, at least one of the two microprocessors can be an already existing microprocessor or a microprocessor used independently, possibly on its own, on other cards, which enables a microprocessor that has already been certified and/or of lower cost to be used.

According to particular features, the first microprocessor uses a lower level of security than the second microprocessor.

Thanks to these provisions, a microprocessor card reader implementing only the security level of the first microprocessor can cause the first microprocessor to operate. Moreover, the second microprocessor can have increased security because its commands reach it exclusively from the first microprocessor.

The security levels are well known to the person skilled in the art. In particular, microprocessors and banking applications are generally certified by the common criteria method (corresponding to the ISO 15408 standard) at a level higher than or equal to EAL4 (Evaluation Assurance Level 4), typically at the level EAL4+. On the other hand, mobile telephone microprocessors and applications are generally not certified according to the common criteria. This is explained by the fact that, in the mobile telephone field, there are lower requirements in terms of security and higher requirements in terms of the response time of the card, than in the payment field.

According to particular features, the first microprocessor implements a mobile telephone network subscriber identification application.

According to particular features, the second microprocessor implements a payment application.

According to particular features, the second microprocessor conforms to the Europay Mastercard Visa (EMV) standard.

According to particular features, the first microprocessor comprises means for communication with a wireless communication interface of a card reader.

Accordingly, for example in the case of a mobile telephone provided with communication means according to the NFC (Near Field Communication) standard, payment can be effected using an already existing payment microprocessor certified in accordance with the common criteria.

According to particular features, said communication means use a single wire protocol (SWP) as the communication protocol.

According to particular features, the first microprocessor comprises means for communicating with the outside of the card via flush contacts of the card.

According to particular features, the first microprocessor comprises means for communication with the outside of the card including a wireless communication interface.

According to particular features, the first microprocessor comprises means for identifying a command intended for the first microprocessor and for identifying a command intended for the second microprocessor.

According to particular features, identification means are adapted to identify, in each command intended for the second microprocessor, data indicating that said command is intended for the second microprocessor.

According to particular features, the identification means are adapted to switch the operating mode of the first microprocessor between:
 a first operating mode in which all commands coming from the reader are transmitted by the first microprocessor to the second microprocessor, and
 a second operating mode in which the first microprocessor does not transmit any command coming from the reader to the second microprocessor.

A second aspect of the present invention is directed to a microprocessor card including a first microprocessor, the method including a step of execution of a first application by the first microprocessor, characterized in that it further comprises:
 a step of the first microprocessor forwarding to the second microprocessor of the card at least one command coming from outside the card, and
 a step of the first microprocessor forwarding to the outside of the card at least one response to a command coming from the second microprocessor.

According to particular features, le method according to the present invention comprises a step of the first microprocessor determining, according to a first application software, the microprocessor commands to be transmitted to the second microprocessor.

According to particular features, during the step of transmission by the first microprocessor to the second microprocessor, the first microprocessor commands the second microprocessor by means of commands conforming to the ISO 7816 standard.

According to particular features, the card according to the present invention comprises a step of the first microprocessor supplying the second microprocessor, in a manner conforming to the ISO 7816 standard, with a clock signal based on a clock signal internal to the first microprocessor.

According to particular features, the card according to the present invention comprises a step of inhibiting the clock signal supplied to the second microprocessor as a function of commands received from outside the card by the first microprocessor.

According to particular features, the card according to the present invention comprises a step of the first microprocessor supplying a reset signal to the second microprocessor in accordance with the ISO 7816 standard.

According to particular features, the card according to the present invention comprises a step of the first microprocessor processing commands received from outside the card and a step of the second microprocessor processing commands received from the first microprocessor, processing by the first microprocessor using a lower level of security than processing by the second microprocessor.

According to particular features, the card according to the present invention comprises a step of the first microprocessor executing a mobile telephone network subscriber identification application.

According to particular features, the card according to the present invention comprises a step of the second microprocessor executing a payment application.

According to particular features, the first microprocessor employs means for communication with a wireless communication interface of a card reader.

According to particular features, during the step of transmission to the outside of the card, the first microprocessor employs a single wire protocol (SWP) as the communication protocol.

According to particular features, during at least one transmission step the first microprocessor uses at least one flush contact of the card to communicate with a microprocessor card reader.

According to particular features, during at least one transmission step, the first microprocessor uses communication means including a wireless communication interface.

According to particular features, the card according to the present invention comprises a step of identifying a command intended for the first microprocessor and/or a command intended for the second microprocessor.

According to particular features, during the identification step, data in each command intended for the second microprocessor and indicating that said command is intended for the second microprocessor is processed.

According to particular features, during the identification step, the operating mode of the first microprocessor is switched between:
 a first operating mode in which all commands coming from the reader are forwarded by the first microprocessor to the second microprocessor, and
 a second operating mode in which the first microprocessor does not forward any commands coming from the reader to the second microprocessor.

A third aspect of the present invention is directed to a microprocessor card reader including means for communicating with a first microprocessor of a card, characterized in that said communication means are further adapted to transmit to the first microprocessor at least one command coming from outside the card and intended for a second microprocessor and receiving at least one response to a command from the second microprocessor via the first microprocessor.

According to particular features, the card according to the present invention comprises means for commanding the second microprocessor via the first microprocessor by means of commands conforming to the ISO 7816 standard.

According to particular features, the card according to the present invention comprises means for identifying a command intended for the microprocessor and means for identifying a command intended for the second microprocessor.

According to particular features, the card according to the present invention comprises means for inserting into each command intended for the second microprocessor data that enables the first microprocessor to detect that it is a command intended for the second microprocessor.

According to particular features, the card according to the present invention comprises means for switching the operating mode of the first microprocessor between:
  a first operating mode in which all commands coming from the reader are forwarded by the first microprocessor to the second microprocessor, and
  a second operating mode in which the first microprocessor does not forward any command coming from the reader to the second microprocessor.

According to particular features, the card according to the present invention uses a lower level of security with an application of the first microprocessor than with an application of the second microprocessor.

According to particular features, the card according to the present invention uses in conjunction with the first microprocessor a mobile telephone network subscriber identification application.

According to particular features, the card according to the present invention uses in conjunction with the second microprocessor a payment application.

According to particular features, the card according to the present invention comprises wireless communication means for communicating with the first microprocessor.

According to particular features, said communication means use the single wire protocol (SWP) as the communication protocol.

According to particular features, the card according to the present invention comprises wireless communication means for communicating with an external reader.

According to particular features, the wireless communication means for communicating with an external reader use a near field communication protocol.

A fourth aspect of the present invention is directed to a mobile telephone that comprises a card reader as succinctly explained hereinabove.

A fifth aspect of the present invention is directed to a method of marketing a microprocessor card including a "first" microprocessor, characterized in that it comprises a step of certifying a "second" microprocessor and a step of associating the first and second microprocessors on a card, in which association said first microprocessor include means for forwarding to the second microprocessor commands coming from outside the card and to transmit to the outside of the card responses to those commands coming from the second microprocessor.

The advantages, aims and particular features of this method, this reader, this telephone and this marketing method being similar to those of the card that is the subject matter of the present invention, as briefly explained hereinabove, they are not repeated here.

Figure 2:
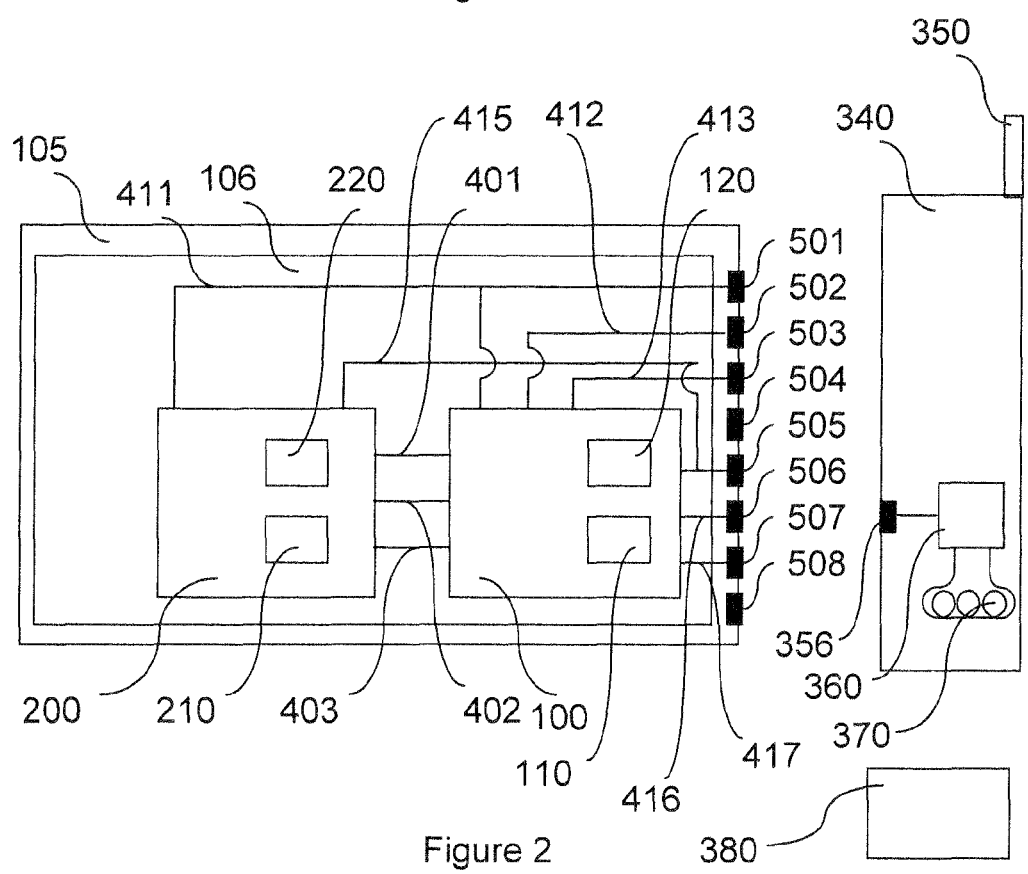
Figure 3:
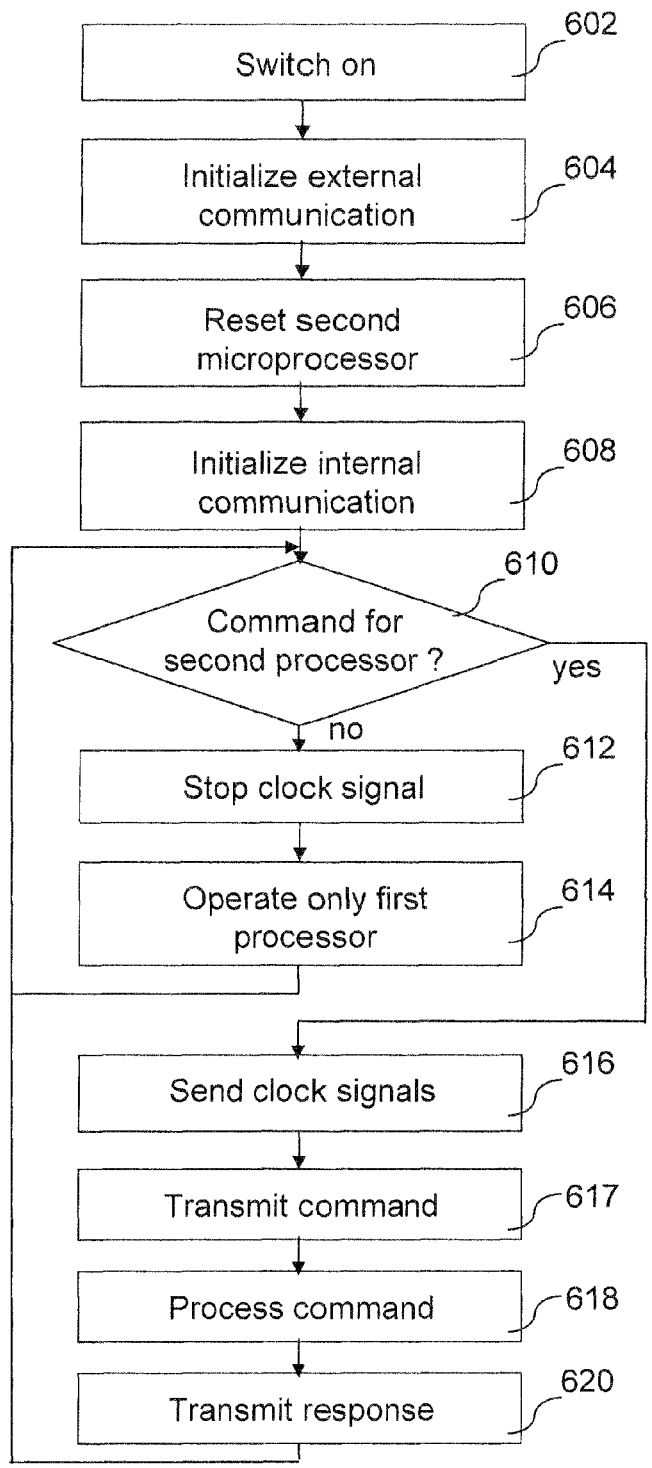
Figure 4:
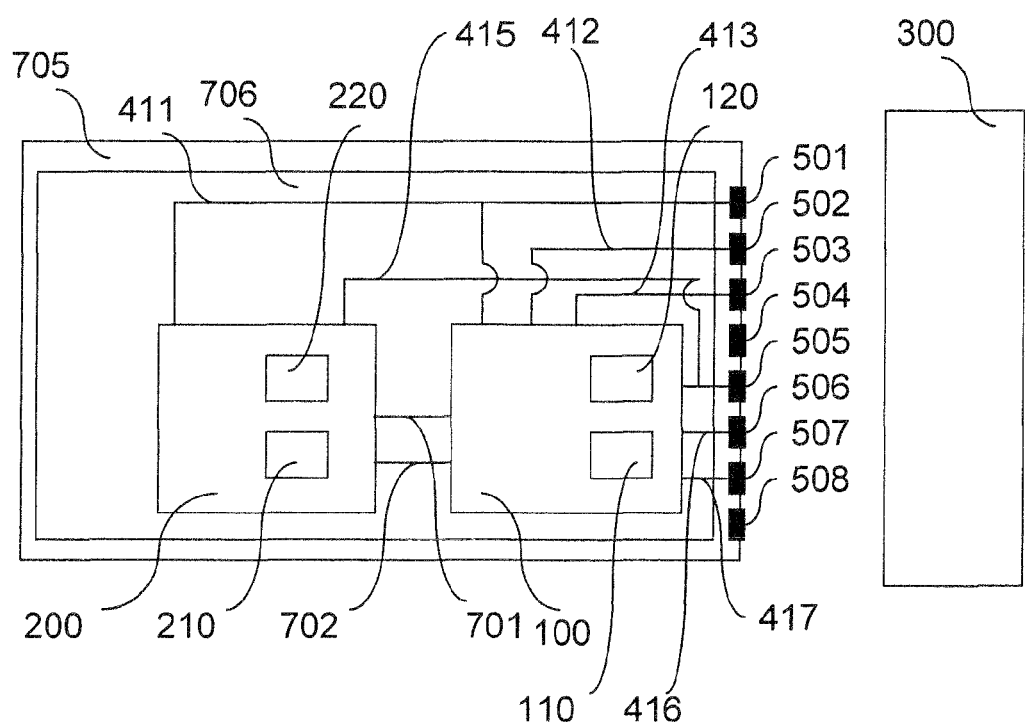
Figure 5:
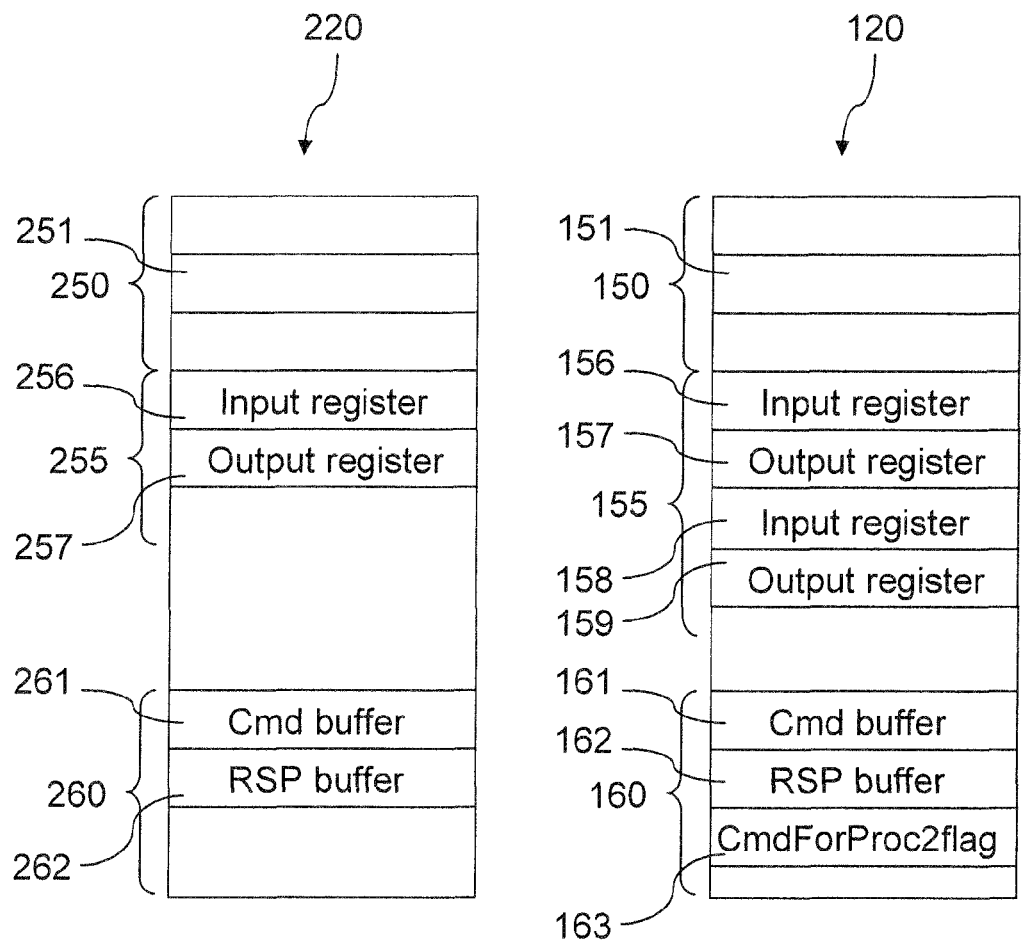

Other advantages, aims and particular features of the present invention will emerge from the following description given by way of an explanatory and nonlimiting example with reference to the appended drawings, in which:

FIG. 1 represents diagrammatically a first particular embodiment of the card and the reader which are the subject matter of the present invention, FIG. 2 represents diagrammatically a second particular embodiment of the card and the reader which are the subject matter of the present invention, FIG. 3 represents in the form of a flowchart steps of one particular embodiment of the method that is the subject matter of the present invention, FIG. 4 represents diagrammatically a third embodiment of the card and the reader that are the subject matter of the present invention and FIG. 5 represents the content of memories associated with two processors.

FIG. 1 shows a card 105 including an electronic module 106 that comprises a first microcircuit 100, a second microcircuit 200, flush contacts 501 to 508 intended to be connected to a card reader 300, and electrical connections that connect the microcircuits 100 and 200 to each other and to the flush contacts.

The first microcircuit 100 comprises a first microprocessor 110 associated with a first memory 120 holding executable (or interpretable) code instructions of a first application as shown on FIG. 5. The second microcircuit 200 comprises a second microprocessor 210 associated with a second memory 220 holding executable (or interpretable) code instructions of a second application as shown on FIG. 5. Each of the microcircuits 100 and 200 is a microcontroller including a microprocessor and a memory, for example.

In the first and second applications, the first microprocessor 110 preferably employs a lower level of security than the second microprocessor 210. In the following, "security" means ability to resist attacks, failures or data losses but does not encompass the ability to continue running in adverse environmental conditions.

In particular embodiments, a "level of security" more particularly refers to the ability to resist attacks from unauthorized parties.

In particular embodiments, a "level of security" more particularly refers to methods known by the person skilled in the art as "common criteria methods" (e.g., corresponding to the ISO 15408 standard). In these common criteria methods, "high level" may be considered as higher than or equal to EAL4 (Evaluation Assurance Level 4).

For example, the first application is an application for identifying subscribers to a mobile telephone network, known as a subscriber identification module (SIM), and the second application is a bank payment application, conforming for example to the EMV (Europay Mastercard Visa) standard. Alternatively, the microprocessor 110 is more secure than the microprocessor 210.

Security levels are well known to the person skilled in the art. In particular, microprocessors and banking applications are generally certified by the common criteria method (corresponding to the ISO 15408 standard) at a level higher than or equal to EAL4 (Evaluation Assurance Level 4), typically at the level EAL4+. On the other hand, mobile telephone microprocessors and applications are generally not certified according to the common criteria. This is explained by the fact that, in the mobile telephone field, there are lower requirements in terms of security and higher requirements in terms of the response time of the card, than in the payment field.

If the first application is a mobile telephone application the card reader 300 is a mobile telephone.

An input/output internal connection 401 interconnects the two microprocessors 110 and 210 and enables information to be exchanged between them. Exchanges of information over the internal connection 401 preferably conform to the ISO 7816 standard. A clock internal connection 402 carries a clock signal from the first microprocessor 110 to the second microprocessor 210, enabling the first to time or inhibit the operation of the second.

More particularly, the clock signal supplied by first microprocessor 110 to second microprocessor 210 may be based on a clock signal that is internal to the first microprocessor 110. For example, the clock signal supplied to the second microprocessor 210 may have a frequency that is:
    at particular instants, the frequency of the clock signal internal to the first microprocessor 110 divided by an integral number,
    at other instants, zero and
    at still other instants, the same as the frequency of the clock signal internal to the first microprocessor 110.

The switching between those frequencies supplied to the second microprocessor 210 may depend on commands, or the last command received from the card reader, or on internal processing performed by the first microprocessor 110.

A reset internal connection 403 carries a reset signal from the first microprocessor 110 to the second microprocessor 210, enabling the first to command resetting of the second.

In the embodiment represented in FIG. 1, the contacts 501 to 508 conform to the ISO 7816 standard.

The first contact 501, denoted "c1" in the ISO 7816 standard, is connected by a first external connection 411 to the first microprocessor 110 and to the second microprocessor 210. This first contact 501 and this first external connection 411 carry a DC power supply voltage generally denoted "Vcc" to the microprocessors 110 and 210 from the reader 300.

The second contact 502, denoted "c2" in the ISO 7816 standard, is connected by a second external connection 412 to the first microprocessor 110. This second contact 502 and this second external connection 412 convey a reset signal, generally denoted "RST", for resetting the microprocessor 110.

The third contact 503, denoted "c3" in the ISO 7816 standard, is connected by a third external connection 413 to the first microprocessor 110 and carries a clock signal, generally denoted "CLK", so that the reader 300 can time the operation of the first microprocessor 110.

The fourth contact 504, denoted "c4" in the ISO 7816 standard, is not connected to either of the microprocessors 110 or 210.

The fifth contact 505, denoted "c5" in the ISO 7816 standard, is connected by a fifth external connection 415 to the first microprocessor 110 and to the second microprocessor 210. This fifth contact 505 and this fifth external connection 415 are connected to the ground, generally denoted "GND", to complete the circuit that supplies power to the microprocessors 110 and 210 from the reader 300.

The sixth contact 506, denoted "c6" in the ISO 7816 standard, is connected by a sixth external connection 416 to the first microprocessor 110 and carries a data signal, here denoted "SWP", implementing the single wire protocol (SWP) for communication between the first microprocessor 110 and the reader 300. For example, the reader 300 sends commands to the card 100 using this contact 506.

The seventh contact 507, denoted "c7" in the ISO 7816 standard, is connected by a seventh external connection 417 to the first microprocessor 110 and carries data, generally denoted "I/O", so that the reader 300 and the first microprocessor 110 can exchange data. For example, the reader 300 sends commands to the card 100 using this contact 507.

The eighth contact 508, denoted "c8" in the ISO 7816 standard, is not connected to either of the microprocessors 110 or 210.

In other embodiments, the first microprocessor 110 comprises receiver means conforming to a protocol for communication with a wireless communication interface conforming to the single wire protocol (SWP).

FIG. 2 shows the card 105 shown in FIG. 1 and a reader consisting of a mobile telephone 340 which has an antenna 350 and an interface circuit 360. The interface circuit 360 is of the near-field type, for example conforming to the NFC standard, has an interface antenna 370 and is connected to a contact 356 for communication with the contact 506 of the card 105.

A reader 380 provided with a near field communication interface, for example conforming to the NFC standard, communicates with the mobile telephone 340 via the interface 360.

Here "near field" refers to a distance of less than 1 meter, preferably less than 50 cm, and typically less than 20 cm. It may be a question, for example, of communication means conforming to the Near Field Communication (NFC) standard or the International Standardization Organization (ISO) standard 14443 concerning radio-frequency identification (RFID), without the invention being limited to these protocols.

One advantage of near field communication is that it enables a user to undertake wireless communication intentionally or knowingly by bringing a portable device close to a fixed reader, typically to a distance of a few centimeters. In the case of a contactless microcircuit payment card, for example, with dimensions conforming to the ISO 7816 standard, for example, this distance limits the risk of the account of the cardholder being debited without the cardholder having indicated that this is what they want by moving their card to within a few centimeters of an appropriate reader and thereby entering into a transaction payment between the reader and their card.

In the case of applications with high security requirements, for example transaction or payment applications, the reader 380 sends commands to the second microprocessor 210 and receives responses from it. These commands are adapted so that they can be recognized by the first microprocessor 110 as intended for the second microprocessor 210, as explained hereinabove. To this end, it is either the mobile telephone 340 or the reader 380 that effects the adaptation.

FIG. 3 shows a step 602 of the reader 300 switching on the card 106. Then, during a step 604, communication between the card 106 and the reader 300 is initialized according to the ISO 7816 standard.

During a step 606, the first microprocessor 110 sends a reset signal to the second microprocessor 210 together with a clock signal for timing the operation of the second microprocessor 210. In the embodiment described with reference to FIG. 1, the first microprocessor 110 supplies a reset signal to the second microprocessor 210 in accordance with the ISO 7816 standard, that signal corresponding to the contact c2 of the ISO 7816 standard.

During a step 608, the microprocessors 110 and 210 initialize communication between them. In the embodiment described and shown, this communication is effected in accordance with the ISO 7816 protocol. In this communication, the first microprocessor 110 behaves as a reader of the second microprocessor 210, except for the supply of electrical power.

During a step 610, the first microprocessor 110 receives a command from the reader 300. This command is received by the card 100 on the contact 507 (c7), for example, and conforms to the ISO 7816 standard (it is an APDU command) or is received via the contact 506 (c6) and conforms to the swp protocol. The first microprocessor 110 then determines if it has received a command from the reader 300 intended for the second microprocessor 210 during a predetermined time period, for example the preceding five seconds.

There are various ways for the first microprocessor 110 to determine if a command is intended for the second microprocessor 210.

In this case, it is the reader 300 or 340 that generates the commands. In the case of the second embodiment shown in FIG. 2, it is the external reader 340 or the NFC interface circuit 360 that adapts the commands so that the first microprocessor 110 recognizes commands for the attention of the second microprocessor 210. To this end, in a first embodiment, there is inserted into each command intended for the second microprocessor 210 data that enables the first microprocessor 110 to detect if it is a command intended for the second microprocessor 210. Symmetrically, when the second microprocessor 210 sends the first microprocessor 110 a response intended for the reader 300, it inserts into this response data identifying the reader 300 as the intended recipient. In a second embodiment, the mode of the first microprocessor 110 is switched between:

- a first operating mode in which all commands from the reader 300 are forwarded by the first microprocessor 110 to the second microprocessor 210 and in which all responses coming from the second microprocessor 210 are forwarded by the first microprocessor 110 to the reader 300, and
- a second operating mode in which the first microprocessor 110 does not forward any command coming from the reader 300 to the second microprocessor 210.

To effect the switching of the operating mode of the first microprocessor 110, the reader 300 uses, for example, an APDU (Application Protocol Data Unit) command "select".

If the first microprocessor 110 does not receive any command from the reader 300 intended for the second microprocessor 210 during the predetermined time period, the first microprocessor 110 interrupts the clock signal intended for the second microprocessor 210, which goes to the standby mode during a step 612. This step 612 can easily be implemented by the first microprocessor 110 using a "timer" that counts down the clock signals until a predetermined value is reached and then launches an interrupt that interrupts transmission of the clock signal to the second microprocessor 210.

If the second microprocessor 210 comprises means for switching to standby mode in the absence of a clock signal, inhibiting the clock signal transmitted by the first microprocessor 110 to the second microprocessor 210 saves on the current supplied by the reader, which can be particularly critical if the reader is in a battery-powered portable object such as a mobile telephone. In other embodiments, the first microprocessor 110 can command switching of a portion of the second microprocessor 210 to the standby mode. The first microprocessor 110 then operates in a manner known to the person skilled in the art, for example as a SIM card in the context of a mobile telephone application, during a step 614, and returns regularly to the step 610. During the step 614, the first microprocessor executes each command that is intended for it and sends a response back to the reader 300.

If, during a step 610, the first microprocessor determines that it has received a command from the reader 300 intended for the second microprocessor 210, the first microprocessor 110 sends the clock signal to the second microprocessor 210, which resumes operation during a step 616. For some types of microprocessor and some ways of going to the standby mode, during the step 616, the first microprocessor 110 commands a reset of the second microprocessor 210.

During a step 617 the first microprocessor 110 forwards to the second microprocessor 210 each command intended for the second microprocessor 210.

Alternatively, the first microprocessor 110 generates commands for the second microprocessor 210 as a function of commands received from the reader 300. Alternatively, the first microprocessor 110 generates commands for the second microprocessor 210 as a function of a command received from the reader 300 and information stored in the associated memory 120.

The second processor 210 then processes that command, which is of the APDU type conforming to the ISO 7816 standard, for example, and returns a response to the first microprocessor 110, intended for the reader 300, during a step 618.

Then, during a step 620, the first microprocessor 110 forwards the response received from the second microprocessor 210 to the reader 300 and returns to the step 610.

Applications of the present invention include microprocessor cards conforming to the ISO 7816 standard and microprocessor cards conforming to the MMC standard.

Applications with a high security requirement, for example payment or identity (passport, identity card) applications, are preferably stored in the memory 220 and executed by the second microprocessor 210. The memory 220 is preferably a non-volatile memory, for example of read-only memory (ROM) type.

On the other hand, applications with a moderate security requirement, for example mobile telephone applications (for example mobile telephone network subscriber identification applications) or transport applications (for example a card providing access to a public transport network) are saved by the memory 120 and executed by the first microprocessor 110. These applications generally do not need certification or may necessitate certification that is much less time-consuming and costly than applications with a high security requirement.

The present invention therefore enables both types of application to co-exist on the same card and facilitates updating of applications with a moderate security requirement, without having to recertify applications with a high security requirement.

FIG. 4 shows a card 705 including an electronic module 706 that comprises the first microcircuit 100, the second microcircuit 200, the flush contacts 501 to 508 intended to be connected to the card reader 300, and electrical connections connecting the microcircuits 100 and 200 to each other and to the flush contacts.

The first microcircuit 100 and the second microcircuit 200 are identical to those described with reference to FIG. 1 except that they are adapted to communicate with each other using the universal serial bus (USB) protocol.

Two internal connections 701 and 702 interconnect the two microprocessors 110 and 210 and enable exchange of information between them. These connections correspond to the "D+" and "D−" lines of the USB standard. Information is exchanged over these internal connections 701 and 702 in accordance with the USB standard.

The implementation of the method that is the subject matter of the present invention using the card shown in FIG. 4 is similar to that shown in FIG. 3, except for the steps 612 and 616, which concern clock signals.

As shown in FIG. 5, in particular embodiments, the first memory 120 associated with first microprocessor 110 comprises a read-only (or ROM) portion 150, a register portion 155 and a random access (or RAM) portion 160. The ROM portion 150 particularly stores an application 151 that controls communications between the first microprocessor 110 and the second microprocessor 210.

The register portion 155 comprises four registers: an input register 156 associated with reader 300, an output register 157 also associated with reader 300, an input register 158 associated with the second microprocessor and an output register 159 associated with the second microprocessor. The RAM portion 160 comprises a command buffer "Cmd buffer" 161, a response buffer "RSP buffer" 162 and a flag for commands for the second processor "CmdForProc2flag".

The second memory 220 associated with second microprocessor 210 comprises a read-only (or ROM) portion 250, a register portion 255 and a random access (or RAM) portion 260. The ROM portion 250 particularly stores an application 251 that controls communications between the first microprocessor 110 and the second microprocessor 210.

The register portion 255 comprises an input register 256 and an output register 257. The RAM portion 260 comprises a command buffer "Cmd buffer" 261 and a response buffer "RSP buffer" 262.

The microprocessor 110 executes the application 151, which may be part of the operating system. For example, the application 151 operates steps 604, 606, 608, 610, 612, 614, 616, 617 and 620 described with regards to FIG. 3. Particularly, during step 610, microprocessor 110 reads a command from the card reader 300 into input register 156, copies the content of input register 156 to the command buffer 161. Then, if the value of the flag CmdForProc2flag is set to "1", which means that each command should be transmitted to processor 210, microprocessor 110 proceeds to step 616. Otherwise, microprocessor 110 proceeds to step 612.

In an alternative embodiment, instead of deciding whether to transmit a command on the basis of the value of a flag, a function is used. The input to this is the content of the command buffer 161. This allows some property of the command itself to be used to determine whether the command is to be transmitted to the second microprocessor. If this function returns true, microprocessor 110 proceeds to step 612.

During step 617, microprocessor 110 copies the content of command buffer 161 to output register 159 and writes the content of output register 159 to the internal connection 401.

Microprocessor 210 executes the application 251, which may be part of the operating system. For example, the application 251 operates step 618 described with regards to FIG. 3. During step 618, microprocessor 210 reads a command from the internal connection 401 into input register 256, copies the content of input register 256 to command buffer 261, processes the command stored in command buffer 261, writes the response to response buffer 262, copies the content of response buffer 262 to output register 257 and writes the content of output register 257 to the internal connection 401. Microprocessor 110 copies the response from 401 into the input register 158, the response is then copied from register 158 to register 157 and out to the reader.

In other embodiments, not shown, the microprocessors use a MultiMedia Card (MMC) communication protocol.

As an alternative for each of the embodiments of the card that is the subject matter of the present invention, the first microprocessor comprises communication means including a wireless communication interface.

As an alternative for each of the embodiments, the first microprocessor and the second microprocessor are designed to exhibit different abilities to continue running in extreme environmental conditions (e.g., extremes of temperature, electromagnetic fields, radio frequencies, power supply voltages, mechanical vibrations or other mechanic stresses).

The invention claimed is:

1. A microprocessor card comprising:
a first microprocessor, that comprises a second microprocessor, said first microprocessor including means for transmitting to the second microprocessor commands coming from outside the card and for transmitting to the outside of the card responses to those commands coming from the second microprocessor, the first microprocessor being adapted to use a lower level of ability to resist attacks, failures or data losses than the second microprocessor.

2. The microprocessor card according to claim 1, wherein the first microprocessor is adapted to run a first application software that determines the microprocessor commands to be transmitted to the second microprocessor.

3. The microprocessor card according to claim 1, further comprises external electrical contacts intended to convey control signals, said external electrical contacts being connected only to the first microprocessor.

4. The microprocessor card according to claim 1, wherein the first microprocessor comprises means for controlling the second microprocessor with commands conforming to the ISO 7816 standard.

5. The microprocessor card according to claim 4, further comprises at least one input/output line according to the ISO 7816 standard that connects the two microprocessors and is used to exchange information between the two microprocessors.

6. The microprocessor card according to claim 4, wherein a clock connection connects the two microprocessors, the first microprocessor supplying to the second microprocessor in a manner conforming to the ISO 7816 standard, a clock signal based on a clock signal internal to the first microprocessor.

7. The microprocessor card according to claim 6, wherein the first microprocessor comprises means for inhibiting said clock signal supplied to the second microprocessor.

8. The microprocessor card according to claim 4, wherein the first microprocessor is adapted to supply a reset signal to the second microprocessor in a manner that conforms to the ISO 7816 standard.

9. The microprocessor card according to claim 1, wherein the two microprocessors are connected in parallel to two flush power supply contacts.

10. The microprocessor card according to claim 1, wherein the two microprocessors are parts of two different microcircuits.

11. The microprocessor card according to claim 1, wherein the first microprocessor implements a mobile telephone network subscriber identification application.

12. The microprocessor card according to claim 1, wherein the second microprocessor implements a payment application.

13. The microprocessor card according to claim 1, wherein the second microprocessor conforms to the Europay Mastercard Visa (EMV) standard.

14. The microprocessor card according to claim 1, wherein the first microprocessor comprises means for communication with a wireless communication interface of a card reader.

15. The microprocessor card according to claim 14, wherein said communication means use a single wire protocol (SWP) as a communication protocol.

16. The microprocessor card according to claim 1, wherein the first microprocessor comprises means for communicating with the outside of the card via flush contacts of the card.

17. The microprocessor card according to claim 1, wherein the first microprocessor comprises means for communication with the outside of the card including a wireless communication interface.

18. The microprocessor card according to claim 1, wherein the first microprocessor identifies, for at least one of the first and second microprocessors, a command intended for one of the first and second microprocessor.

19. The microprocessor card according to claim 18, wherein the identification means are adapted to identify, in each command intended for the second microprocessor, data indicating that said command is intended for the second microprocessor.

20. The microprocessor card according to claim 18, wherein the identification means are adapted to switch an operating mode of the first microprocessor between:
 a first operating mode in which all commands coming from a reader are transmitted by the first microprocessor to the second microprocessor, and
 a second operating mode in which the first microprocessor does not transmit any command coming from the reader to the second microprocessor.

21. The microprocessor card according to claim 1, wherein the first microprocessor is adapted to use a lower level of ability to resist attacks from unauthorized parties than the second microprocessor.

22. The microprocessor card according to claim 1, wherein the second microprocessor provides at least EAL4 (Evaluation Assurance Level 4) security level defined by ISO 15408 standard.

23. A communication method for a microprocessor card including a first microprocessor, the method including a step of execution of a first application by the first microprocessor, wherein the method further comprises:
 a step of the first microprocessor forwarding to the second microprocessor of the card a command coming from outside the card,
 a step of the first microprocessor sending to the outside of the card a response to a command coming from the second microprocessor, and
 a step of the first microprocessor processing commands received from outside the card and a step of the second microprocessor processing commands received from the first microprocessor, processing by the first microprocessor using a lower level of ability to resist attacks, failures or data losses than processing by the second microprocessor.

24. The communication method according to claim 23, wherein the method further comprises a step of the first microprocessor determining, according to a first application software, the microprocessor commands to be transmitted to the second microprocessor.

25. The communication method according to claim 23, wherein, during the step of transmission by the first microprocessor to the second microprocessor, the first microprocessor commands the second microprocessor by means of commands conforming to the ISO 7816 standard.

26. The communication method according to claim 23, wherein the method comprises a step of the first microprocessor supplying the second microprocessor, in a manner conforming to the ISO 7816 standard, with a clock signal based on a clock signal internal to the first microprocessor.

27. The communication method according to claim 26, wherein the method comprises a step of inhibiting the clock signal supplied to the second microprocessor as a function of commands received from outside the card by the first microprocessor.

28. The communication method according to claim 23, wherein the method comprises a step of the first microprocessor supplying a reset signal to the second microprocessor in accordance with the ISO 7816 standard.

29. The communication method according to claim 23, wherein the method comprises a step of the first microprocessor executing a mobile telephone network subscriber identification application.

30. The communication method according to any claim 23, wherein the method comprises a step of the second microprocessor executing a payment application.

31. The communication method according to claim 23, wherein, during the step of transmission to the outside of the card, the first microprocessor employs means for communication with a wireless communication interface of a card reader.

32. The communication method according to claim 31, wherein, during the step of transmission to the outside of the card, the first microprocessor employs a single wire protocol (swp) as a communication protocol.

33. The communication method according to claim 22, wherein during at least one transmission step the first microprocessor uses at least one flush contact of the card to communicate with a microprocessor card reader.

34. The communication method according to claim 23, wherein, during at least one transmission step, the first microprocessor uses communication means including a wireless communication interface.

35. The communication method according to claim 23, wherein the method comprises a step of identifying a command intended for the first microprocessor and/or a command intended for the second microprocessor.

36. The communication method according to claim 35, wherein, during the identification step, data in each command intended for the second microprocessor and indicating that said command is intended for the second microprocessor is processed.

37. The communication method according to claim 35, wherein, during the identification step, an operating mode of the first microprocessor is switched between:
 a first operating mode in which all commands coming from a reader are forwarded by the first microprocessor to the second microprocessor, and
 a second operating mode in which the first microprocessor does not forward any commands coming from the reader to the second microprocessor.

38. A microprocessor card reader including means for communicating with a first microprocessor of a card, wherein said communication means are further adapted to transmit to the first microprocessor a command coming from outside the card and intended for a second microprocessor and receiving a response to a command from the second microprocessor via the first microprocessor, said card reader using a lower level of ability to resist attacks, failures or data losses, with an application of the first microprocessor, than with an application of the second microprocessor.

39. The microprocessor card reader according to claim 38, further comprises means for commanding the second microprocessor via the first microprocessor by means of commands conforming to the ISO 7816 standard.

40. The microprocessor card reader according to claim 38, further identifies a command intended for the first microprocessor and identifies a command intended for the second microprocessor.

41. The microprocessor card reader according to claim 40, further comprises means for switching an operating mode of the first microprocessor between:
 a first operating mode in which all commands coming from the reader are forwarded by the first microprocessor to the second microprocessor, and
 a second operating mode in which the first microprocessor does not forward any command coming from the reader to the second microprocessor.

42. The microprocessor card reader according to claim 38, wherein the microprocessor card reader uses a lower level of security, with an application of the first microprocessor, than with an application of the second microprocessor.

43. The microprocessor card reader according to claim 38, wherein the microprocessor card uses in conjunction with the first microprocessor a mobile telephone network subscriber identification application.

44. The microprocessor card reader according to claim 38, wherein the microprocessor card uses in conjunction with the second microprocessor a payment application.

45. The microprocessor card reader according to claim 38, further comprises wireless communication means for communicating with the first microprocessor.

46. The microprocessor card reader according to claim 45, wherein said communication means use the single wire protocol (SWP) as a communication protocol.

47. The microprocessor card reader according to claim 38, further comprises wireless communication means for communicating with an external reader.

48. The microprocessor card reader according to claim 47, wherein the wireless communication means for communicating with an external reader use a near field communication protocol.

49. A mobile telephone, comprising a card reader according to claim 38.

50. The microprocessor card reader according to claim 38, that uses a lower level of ability to resist attacks from unauthorized parties, with an application of the first microprocessor, than with an application of the second microprocessor.

51. A method of marketing a microprocessor card including a first microprocessor, comprising a step of certifying a second microprocessor and a step of associating the first and second microprocessors on a card, in which association said first microprocessor comprises means for forwarding to the second microprocessor commands coming from outside the card and to transmit to the outside of the card responses to those commands coming from the second microprocessor, the step of certifying the second microprocessor certifying a higher level of ability to resist attacks, failures or data losses, for the second microprocessor than for the first microprocessor.

* * * * *